United States Patent
Tripp et al.

(10) Patent No.: US 8,551,386 B2
(45) Date of Patent: Oct. 8, 2013

(54) IMPARTING TEXTURE TO CURED POWDER COATINGS

(75) Inventors: Michael J. Tripp, Standish, ME (US); David H. Juers, Cape Elizabeth, ME (US)

(73) Assignee: S.D. Warren Company, Boston, MA (US)

(*) Notice: Subject to any disclaimer, the term of this patent is extended or adjusted under 35 U.S.C. 154(b) by 552 days.

(21) Appl. No.: 12/534,611

(22) Filed: Aug. 3, 2009

(65) Prior Publication Data

US 2011/0024938 A1 Feb. 3, 2011

(51) Int. Cl.
*B29C 59/02* (2006.01)

(52) U.S. Cl.
USPC .......................................... 264/319; 264/112

(58) Field of Classification Search
USPC .................................. 264/112, 319
See application file for complete search history.

(56) References Cited

U.S. PATENT DOCUMENTS

| | | | |
|---|---|---|---|
| 2,463,370 A | 3/1949 | Flaster | |
| 3,042,591 A | 7/1962 | Cado | |
| 3,098,438 A | 7/1963 | Freund | |
| 3,573,136 A | 3/1971 | Gardner | |
| 3,682,738 A | 8/1972 | Smith | |
| 3,814,647 A | 6/1974 | Scher et al. | |
| 4,112,189 A | 9/1978 | Terwilliger | |
| 4,138,945 A | 2/1979 | Rejto | |
| 4,289,821 A | 9/1981 | Gray et al. | |
| 4,322,450 A | 3/1982 | Gray et al. | |
| 4,327,121 A | 4/1982 | Gray | |
| 4,388,137 A | 6/1983 | McCarty et al. | |
| 4,546,065 A | 10/1985 | Amendola et al. | |
| 4,560,578 A | 12/1985 | Freeman | |
| 4,740,258 A | 4/1988 | Breitscheidel | |
| 5,116,548 A | 5/1992 | Mallik et al. | |
| 5,460,921 A | 10/1995 | Cywar | |
| 5,874,145 A | 2/1999 | Waller | |
| 5,992,320 A | 11/1999 | Kosaka et al. | |
| 6,110,317 A | 8/2000 | Sandor | |
| 6,207,003 B1 | 3/2001 | McClure et al. | |
| 6,238,750 B1 | 5/2001 | Correll et al. | |
| 6,272,275 B1 | 8/2001 | Cortright et al. | |
| 6,355,343 B1 | 3/2002 | Glassock | |
| 6,406,585 B1 | 6/2002 | Taubert | |
| 6,635,202 B1 | 10/2003 | Bugg et al. | |

(Continued)

FOREIGN PATENT DOCUMENTS

CN 1541852 11/2004
DE 196 49 116 5/1998

(Continued)

OTHER PUBLICATIONS

BASF Handbook on Basics of Coating Technology, 2003, pp. 723-727.

(Continued)

*Primary Examiner* — Robert J Grun
(74) *Attorney, Agent, or Firm* — Fish & Richardson P.C.

(57) ABSTRACT

Methods for imparting a texture to a cured powder coated surface are provided. These methods involve heating the cured powder coating to a temperature greater than its glass transition point ($T_g$), then imparting a texture to the cured powder coating under pressure using a release medium having a replicative surface. After the texture is imparted to the cured powder coating, the release medium can be removed. Examples of suitable release media include, for example, engraved plates, engraved rolls, release papers, release films, and release webs.

39 Claims, 1 Drawing Sheet

(56) References Cited

U.S. PATENT DOCUMENTS

| | | |
|---|---|---|
| 6,861,024 B2 | 3/2005 | Glassock |
| 6,936,181 B2 | 8/2005 | Bulthaup et al. |
| 6,973,710 B2 | 12/2005 | Kiguchi et al. |
| 7,018,680 B2 | 3/2006 | Kasma et al. |
| 7,156,945 B2 | 1/2007 | Chaug et al. |
| 7,175,876 B2 | 2/2007 | Free et al. |
| 7,261,920 B2 | 8/2007 | Haubrich et al. |
| 7,393,081 B2 | 7/2008 | Maekawa et al. |
| 7,608,476 B2 | 10/2009 | Ramsdale et al. |
| 7,629,017 B2 | 12/2009 | Kodas et al. |
| 7,732,349 B2 | 6/2010 | Yamamoto |
| 2004/0028834 A1 | 2/2004 | Dove et al. |
| 2004/0142181 A1 | 7/2004 | Marsella et al. |
| 2005/0123678 A1 | 6/2005 | Maijala et al. |
| 2006/0130421 A1 | 6/2006 | Nollet et al. |
| 2006/0144004 A1 | 7/2006 | Nollet et al. |
| 2006/0172061 A1 | 8/2006 | Kohmura et al. |
| 2006/0237229 A1 | 10/2006 | Sugahara |
| 2008/0016686 A1 | 1/2008 | Lee |
| 2008/0153000 A1 | 6/2008 | Salot et al. |
| 2008/0248205 A1 | 10/2008 | Blanchet et al. |
| 2008/0268203 A1 | 10/2008 | Blenkhorn |
| 2009/0032492 A1 | 2/2009 | Kunze-Concewitz |
| 2009/0032493 A1 | 2/2009 | Chang |
| 2009/0133909 A1 | 5/2009 | Blenkhorn |

FOREIGN PATENT DOCUMENTS

| | | |
|---|---|---|
| DE | 102005006084 | 8/2006 |
| EP | 0 065 043 | 11/1982 |
| EP | 148611 A2 | 7/1985 |
| EP | 1473594 | 11/2004 |
| EP | 1363770 | 10/2006 |
| EP | 2 025 413 | 2/2009 |
| EP | 2 025413 | 2/2009 |
| GB | 1 392 920 | 5/1975 |
| GB | 1392920 | 5/1975 |
| GB | 2 063 178 | 6/1981 |
| KR | 2003 0040695 | 5/2003 |
| WO | WO 9015673 | 12/1990 |
| WO | WO 99/38680 | 8/1999 |
| WO | WO 9961168 | 12/1999 |
| WO | WO 00/52975 | 9/2000 |
| WO | WO 03/076083 | 9/2003 |
| WO | WO 03/076716 | 9/2003 |
| WO | WO 03/077371 | 9/2003 |
| WO | WO 03074197 | 9/2003 |
| WO | WO 03074198 | 9/2003 |
| WO | WO 2005108114 | 11/2005 |
| WO | WO 2007/059805 | 5/2007 |
| WO | WO 2010/002679 | 1/2010 |

OTHER PUBLICATIONS

PCT/US2010/043320, International Search Report and the Written Opinion, Nov. 18, 2010, 16 pages.

US 8,551,386 B2

IMPARTING TEXTURE TO CURED POWDER COATINGS

BACKGROUND

Powder coating technology involves applying a coating of a thermoplastic or thermoset polymer powder, for example a polyamide, polyester, polyolefin, urethane, acrylic, fluoropolymer or epoxy system, to a substrate and forming a continuous film by coalescing the polymer particles at temperatures greater than their melting point. In the case of thermoset polymers, the powder is also cured, i.e., polymerized, during the coalescence phase. Generally curing of thermoset powders is initiated thermally or by exposure to radiation, e.g., with ultraviolet (UV) light.

Few techniques are known for applying a surface texture to a powder coated substrate. U.S. Pat. No. 6,238,750, for example, discloses techniques that are said to impart smoothness or texture to a powder coated surface by compressing the surface with a "flexible confining membrane" or "an engraved or etched photolithographic pattern on the pressing surface." Some commercial processes impart a crude texture to powder coatings by manipulating the coating formulation, for example by using powders having various particle sizes and melting temperatures in the powder coating formulation.

SUMMARY

Methods for imparting a texture to a cured powder coated surface are described herein. These methods include providing a substrate having a cured powder coating on a surface and heating the cured powder coating to a temperature greater than the $T_g$ of the cured powder coating. Then a texture is imparted to the cured powder coating, e.g., under pressure, using a release medium having a replicative surface. Finally, the release medium is removed from the powder coating.

Additionally methods for applying a textured coating to a substrate include applying a dry, free-flowing powder of a curable material to a substrate to form a powder layer, heating the powder layer sufficiently to cause the powder to melt and form a unified layer, and curing the unified layer to form a cured powder coating on the substrate. Then the cured powder coating is heated to a temperature greater than the $T_g$ of the cured powder coating and a texture is imparted to the cured powder coating, e.g., under pressure, using a release medium having a replicative surface. Finally, the release medium is removed from the powder coating.

DETAILED DESCRIPTION

Methods for imparting a texture to a cured powder coated surface are described. These methods involve providing a substrate having a cured powder coating on its surface, heating the cured powder coating to a temperature greater than its glass transition point ($T_g$), then imparting a texture to the cured powder coating using a release medium having a replicative surface. Once the texture is imparted to the cured powder coating, the release medium is removed. The texture can be imparted to the cured powder coating using, for example, a static press or a pressure nip. The release medium can be, for example, an engraved plate, an engraved roll, a release paper, a release film, or a release web.

Figure 1:
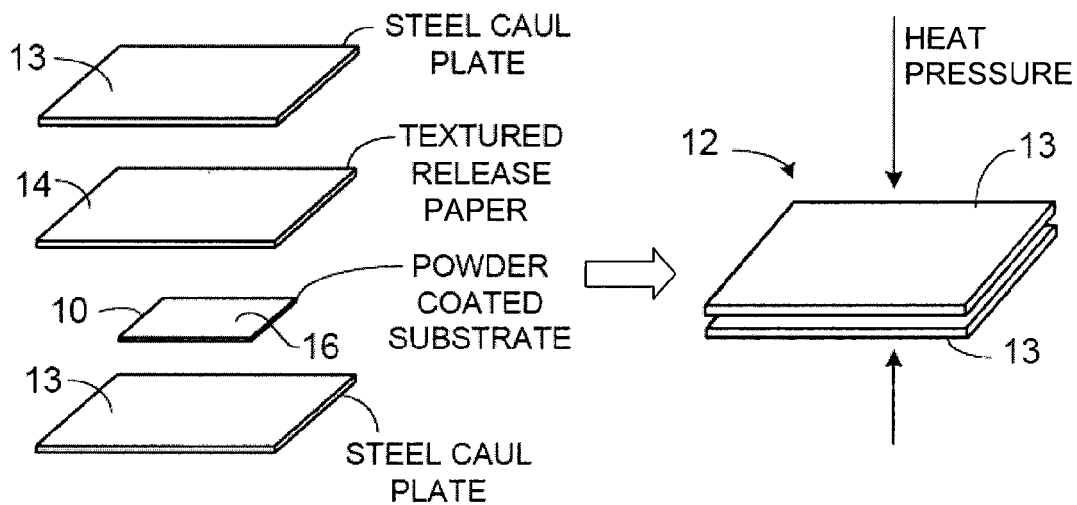
FIG. 1 is a diagrammatic view showing a process for texturing a cured powder coating.

An example of the methods described herein is shown in FIG. 1. Referring to FIG. 1, to impart a texture to the surface 16 of a cured powder coated substrate 10, the surface 16 of a cured powder coated substrate 10 is positioned next to the textured surface of a textured release paper 14, which are both positioned between a pair of steel caul plates 13 to form a sandwich 12. Heat and pressure are then applied to the sandwich 12, i.e., in a press such as a heated press. Similarly, the powder coated substrate 10 or the entire sandwich 12 can be heated prior to pressure being applied as long as a temperature above the $T_g$ for the cured powder coating can be maintained while pressure is applied to the powder coated substrate 10. A heat source (e.g., platen, oven, or infrared (IR) heater) may be used to heat the powder coated substrate 10 prior to the sandwich 12 being pressed. The release medium may be, for example, a textured release paper 14 as shown in FIG. 1 or a release film having a replicative surface. Preferred methods for manufacturing the release medium are described below. Advantageously, release functionality is built into the release medium, thus, it is generally not necessary to modify a powder coating formulation to have release properties, or to use a mold release agent which could transfer to the powder coating surface.

Various devices such as static presses or pressure nips may be used to press the release medium against the cured powder coating. If a press is used to apply pressure, the press is closed with the sandwich 12 inside, and heat and pressure are applied to impart the texture on the surface of the release medium 14 to the surface 16 of the cured powder coating. The temperature applied to heat the cured powder coating is sufficient to heat the cured powder coating to a temperature greater than the $T_g$ of the cured powder coating. The amount of time the textured release medium 14 is pressed against the surface 16 of the cured powder coating, e.g., the press dwell time, is dependent upon factors such as the heating rate of the heating mechanism and the rate of heat transfer to the cured powder coating, and the time should be sufficiently long enough that the pressure is applied while the temperature of the cured powder coating is greater than the $T_g$ of the cured powder coating to achieve the desired texture. If a pressure nip is used to press the release medium against the cured powder coating, heat may be applied to the cured powder coating prior to the release medium, e.g., a release web, and cured powder coating entering the pressure nip. Additionally, one or more rolls of the pressure nip can be heated. As discussed relative to a static press, the temperature applied to heat the cured powder coating is sufficient to heat the cured powder coating to a temperature greater than the $T_g$ of the cured powder coating. The substrate and release medium will travel through the pressure nip when the temperature of the cured powder coating is greater than the $T_g$ of the cured powder coating. Examples of useful temperatures to which a cured powder coating may be heated for use with the methods described herein include 200° F. (93° C.) or greater, 250° F. (121° C.) or greater, 300° F. (149° C.) or greater, 350° F. (177° C.) or greater, 400° F. (204° C.) or greater, 450° F. (232° C.) or greater, or 500° F. (260° C.) or greater as long as the temperature to which the cured powder coating is heated is above the $T_g$ for the cured powder coating.

The textured surface of the release medium is pressed against the surface of the heated, cured powder coating at a level sufficient to transfer the texture of the release medium to the surface of the cured powder coating. The pressure applied is dependent on the viscosity of the cured powder coating after heating above the coating's $T_g$ and is relative to the depth of the texture on the release medium. If other factors are kept constant, a shallow texture generally requires less pressure than a deep texture. Examples of pressure ranges useful with the methods described herein include about 50 p.s.i. (4 bar) to about 1400 p.s.i. (97 bar), about 100 p.s.i. (7 bar) to about 1000 p.s.i. (69 bar), about 200 p.s.i. (14 bar) to about 900 p.s.i. (62 bar), about 300 p.s.i. (21 bar) to about 800 p.s.i. (55 bar), about 400 p.s.i. (28 bar) to about 700 p.s.i. (48 bar), and about 500 p.s.i. (35 bar) to about 600 p.s.i. (41 bar). An example of a combination of a temperature and a pressure useful with the methods described herein is a temperature above the $T_g$ of the cured powder coating and a pressure between 400 p.s.i. (28 bar) to 700 p.s.i. (48 bar). A further example of a temperature and a pressure useful with the methods described herein is a temperature of 255° F. (124° C.) (assuming 255° F. (124° C.) is above the $T_g$ of the cured powder coating) and a pressure of 700 p.s.i. (48 bar; pressed for 15 minutes as example time).

The release medium is removed from the cured powder coating after the texture is imparted to the surface of the cured powder coating. The release medium may be removed from the cured coating immediately after the texture is imparted (pressure being removed immediately also), or the release medium may be left in place and removed at a later time (with pressure being optionally applied or removed during cooling). If the release medium is in sheet form, the cured powder coating can be cooled before or after the release medium is removed. For example, if the release medium is in sheet form the cured powder coating can be cooled prior to removing the release medium. Alternatively, if the release medium is an engraved roll, for example, the cured powder coating can be cooled after the engraved roll has finished contacting the cured powder coating. The cured powder coating may be cooled, for example, below the $T_g$ for the cured powder coating. For example, the cured powder coating can be cooled to 200° F. (93° C.), 180° F. (82° C.), 160° F. (71° C.), 140° F. (60° C.), 120° F. (49° C.), 100° F. (38° C.), 90° F. (32° C.), 80° F. (27° C.), 70° F. (21° C.), 60° F. (16° C.), 50° F. (10° C.), or 40° F. (4° C.) prior to removing the release medium. An especially useful cooling temperature for use with the methods described herein is 70° F. (21° C.).

The release medium has a texture on at least one surface that is capable of being imparted to the surface of the cured powder coating (i.e., a side of the release medium containing a textured surface is contacted with and pressed against the surface of the cured powder coating). The release medium can be, for example, a plate with a textured surface, a roll with a textured surface, a sheet with a textured surface, or a web with a textured surface. As used herein a release sheet is intended to mean paper or film in non-continuous (i.e., sheet) form with a textured release coating on a surface. As used herein a release web is intended to mean paper or film in continuous (i.e., roll) form with a textured release coating on a surface. The texture, i.e., the "hills" and "valleys" on the surface of the release medium, may be formed on the release medium by methods known to those of skill in the art. The texture of the release medium, for example, can have a topography with features below the wavelength of light.

The texture of the release medium can be imparted with low (about 10% to about 40% fidelity), medium (about 40% to about 70% fidelity), high (70% or greater), or 100% fidelity to the cured powder coating (100% fidelity indicating the texture imparted to the surface of the cured powder coating is an exact inverse image of the texture on the surface of the release medium). The level of fidelity of reproduction of the inverse image of the texture of the release medium depends upon factors such as the construction and composition of the substrate and release coating of the release medium used. An example of a release medium capable of producing 100% fidelity is a release medium with a release coating containing an acrylate (see below for examples of acrylate containing release coatings).

For the methods herein, the release medium exhibits satisfactory release properties that are not necessarily directly related to the level of fidelity of reproduction such that the release medium is easily released from the surface of the cured powder coating after the texture is imparted at a given fidelity level. If the desired release properties for a release medium are retained after use, e.g., for ease of release and/or acceptable fidelity levels, the release medium can be reused. The release medium also is resilient enough to withstand the temperatures to which the cured powder coating is heated to exceed the $T_g$ for the cured powder coating, i.e., the modulus of the release medium is greater than the modulus the cured powder coating being texturized. As used herein, the term modulus refers to a measure of a material's resistance to deformation under a given stress. Paper based release mediums can thus be used if the release medium, i.e., paper and coating, will withstand the temperature to which the cured powder coating is heated without deforming when the texture is imparted.

The release medium may be tip printed with an ink or other coating, which will transfer to the surface of the cured powder coating using the methods described herein. Tip printing is described in U.S. Ser. No. 11/670,627, filed Feb. 2, 2007, the complete disclosure of which is incorporated by reference herein. A printing roll is used to apply a printing ink to the raised surfaces, i.e., the "hills," of the pattern on the surface of the release medium. Because only the raised surfaces are coated with ink, the "valleys" or recessed areas of the pattern on the surface of the release medium remain free of ink. Generally, tip printing is accomplished by moving the patterned release medium past the printing roll. Tip printing may be performed using any suitable printing technique, e.g., gravure, flexo, offset, rotary, and other well known printing techniques.

A release medium as described herein can include a substrate material, e.g., paper or film in sheet or web form, with a release coating. Suitable release coatings for use in the methods described herein can include an acrylated oligomer, a monofunctional monomer, and a multifunctional monomer for crosslinking. If ultraviolet radiation is used to cure an acrylic functional release coating, the release coating will also include a photoinitiator as is well known in the art. Preferred acrylated oligomers include acrylated urethanes, epoxies, polyesters, acrylics and silicones. The oligomer contributes substantially to the final properties of the release coating. Practitioners skilled in the art are aware of how to select the appropriate oligomer(s) to achieve the desired final properties. For example, a desirable set of final properties for a release coating as described herein can include an oligomer that provides flexibility and durability. A wide range of acrylated oligomers are commercially available from Cytec Surface Specialties Corporation, such as Ebecryl 6700, 4827, 3200, 1701, and 80, and Sartomer Company, Inc., such as CN-120, CN-999 and CN-2920.

Typical monofunctional monomers useful in forming the release coatings useful in the methods described herein include acrylic acid, N-vinylpyrrolidone, (ethoxyethoxy) ethyl acrylate, or isodecyl acrylate. Preferably the monofunctional monomer is isodecyl acrylate. The monofunctional monomer acts as a diluent, i.e., lowers the viscosity of the coating, and increases flexibility of the coating. Additional examples of monofunctional monomers include SR-395 and SR-440, available from Sartomer Company, Inc., and Ebecryl 111 and ODA-N (octyl/decyl acrylate), available from Cytec Surface Specialties Corporation.

Multifunctional monomers that are useful in forming release coatings useful with the methods described herein include trimethylolpropane triacrylate (TMPTA), propoxylated glyceryl triacrylate (PGTA), tripropylene glycol diacrylate (TPGDA), and dipropylene glycol diacrylate (DPGDA). Preferably the multifunctional monomer is selected from a group consisting of TMPTA, TPGDA, and mixtures thereof. The preferred multifunctional monomer acts as a crosslinker. Examples of multifunctional monomers include SR-9020, SR-351, SR-9003 and SR-9209, manufactured by Sartomer Company, Inc., and TMPTA-N, OTA-480 and DPGDA, manufactured by Cytec Surface Specialties Corporation.

As an example, a composition useful in forming release coatings useful with the methods described herein include (before curing) 20-50% of an acrylated oligomer, 15-35% of a monofunctional monomer, and 20-50% of a multifunctional monomer. The formulation of the release coating composition will depend on the final targeted viscosity and the desired physical properties of the release coating. In some examples, the viscosity is 0.2 to 5 Pascal seconds, and, in other examples, the viscosity is 0.3 to 1 Pascal seconds, measured at room temperature (21-24° C.).

The release coating composition may also include other ingredients such as opacifying agents, colorants, slip/spread agents and anti-static or anti-abrasive additives. The opacity of the release coating may be varied, for example by the addition of various pigments such as titanium dioxide, barium sulfate and calcium carbonate, addition of hollow or solid glass beads, or addition of an incompatible liquid such as water. The degree of opacity can be adjusted by varying the amount of the additive used.

A photoinitiator or photoinitiator package may be included if the release coating is to be UV cured. A suitable photoinitiator is available from the Sartomer Company under the tradename KTO-46™. The photoinitiator may be included at a level of, for example, 0.5-2%.

The cured powder coating material can be any cured powder coating that is cured or cross-linked prior to use in the methods described herein. For example, a dry, free-flowing powder of a curable material can be applied to a substrate to form a powder layer, then the powder layer can be sufficiently heated to cause the powder to melt and form a cured powder coating on the surface of the substrate. The curable material can include an initiator that is capable of being activated by exposure to radiation. The curable material can also include a material capable of absorbing radiation. With an initiator capable of being activated by exposure to radiation, the coating may be cured by radiation curing (e.g., electron beam radiation or UV radiation). Electron beam radiation can be used advantageously to penetrate thick coatings. Electron beam radiation units are readily available and typically consist of a transformer capable of stepping up line voltage and an electron accelerator. Manufacturers of electron beam radiation units include Energy Sciences, Inc., Wilmington, Mass., and PCT Engineered Systems, LLC, Davenport, Iowa. Suitable UV curing devices are commonly available, e.g., from Fusion, Inc., Gaithersburg, Md.

Suitable powder coatings for use in the methods described herein include polyamide, polyester, urethane, acrylic, polyolefin, fluoropolymer and epoxy chemistries such as those that are commercially available from Dupont, Sherwin-Williams, Rohm and Haas, Protech, and others. Other powder coatings may be used, with the conditions for imparting a texture (e.g., time, temperature and pressure) being adjusted to the curing requirements of the particular powder coating formulation (e.g., $T_g$). The powder coating may be clear or colored. The final powder coating properties, such as chemical resistance and release functionality of the cured coating, can be tailored through the selection of the powder coating chemistry.

Figure 2:
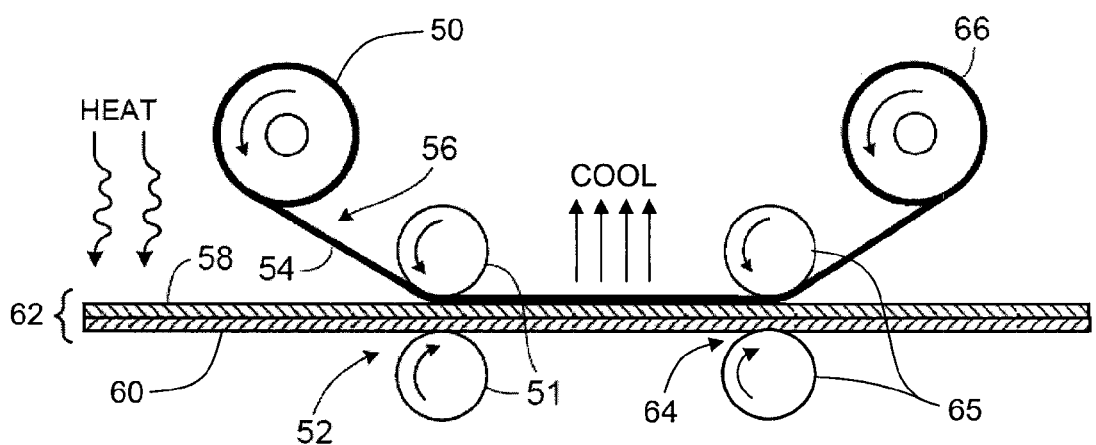
FIG. 2 is a diagrammatic view showing a process for texturing a cured powder coating, using nips and a textured release medium in the form of a continuous web.

A wide variety of substrates for the cured powder coatings described herein may be used as long as the cured powder coating adheres to the substrate before and after the methods described herein. For example, the substrate may be a metal, such as aluminum, steel or other metals, a cellulosic material, such as wood, fiberboard (e.g., medium-density fiberboard), paper, plastic, or any other material that can withstand the conditions under which the cured powder coating is heated and a texture is parted using the release medium. The substrate can also be in the form of a web or a sheet/plate. Referring to FIG. 2, for example, the substrate can be continuous, e.g., in a web form, or discontinuous, e.g., multiple sheets or plates placed end to end on a supporting mechanism such as a belt.

Another method for imparting a texture to a cured powder coating uses a machine configuration as shown in FIG. 2. In FIG. 2, a nip 52 is used to provide sufficient pressure to impart the texture from a textured surface 54 of a release medium 56 to the surface of a cured powder coating 58 on a substrate 60 (which form a powder coated substrate 62). The textured release medium 56 is fed from roll 50 into the nip 52 along with the powder coated substrate 62, which has been previously heated to allow the cured powder coating 58 to melt or soften. After feeding the heated powder coated substrate 62 through the nip 52 with the textured release medium 56, the powder coating may be cooled. Finally, the textured release medium 56 is removed from the cured powder coating, e.g., using a further nip 64 (which includes nip rolls 65) and a take-up roll 66 as shown. As a further example of cooling, nip 64 may be chilled to cool the powder coating as the release medium 56 is removed.

Nip pressure is generally relatively low (e.g., "kiss" pressure), with the nip pressure being selected based on the properties of the cured powder coating when the cured powder coating is raised to temperature above its $T_g$, e.g., viscosity, to prevent the powder coating from being squeezed off of its substrate, while still allowing the texture on the textured release medium to be imparted to the surface of the powder coated substrate. Typically, higher viscosity powder coatings and/or deeper patterns will require relatively higher nip pressures.

A textured, e.g., engraved, roll is one example of a replicative surface that may be used to impart the pattern to the cured powder coating using the methods described herein. The textured roll carries a pattern on its surface, the inverse of which is imparted to the cured powder coated surface. In FIG. 2, for example, rather than using the nips 52 and 64 and release medium 56, a textured roll could impact the heated surface of the powder coated substrate 62 to impart a texture (a single nip roll could be placed opposite the textured roll to create pressure for the textured roll against the surface of the powder coated substrate 62, which passes between the two rolls). Other types of pattern-imparting devices may be used. Rotating endless surfaces are especially useful with the methods described herein, e.g., rotating endless surfaces such as rolls, drums, or other cylindrical surfaces.

In another example of the methods described herein, a dry, free-flowing powder of a curable material is applied to a substrate to form a powder layer and the powder layer is heated sufficiently to cause the powder to melt and form a unified layer. Then, if the powder coating is not already cured by heat, the unified layer is cured (e.g., UV cross-linking) to form a cured powder coating on the substrate. The dry, free-flowing powder coating material may contain an initiator capable of being activated by exposure to radiation and/or a material capable of absorbing the radiation. Once the cured powder coating on the substrate is cooled, the powder coated substrate can be used in the methods described herein immediately or stored for later use. To impart a texture to the cured powder coating, the cured powder coating is heated to a temperature greater than the $T_g$ of the cured powder coating then a texture is imparted using a release medium having a replicative surface. Once the texture is imparted using the release medium, the release medium is removed from the powder coating.

In a further example of the methods described herein, a dry, free-flowing powder of a curable material is applied to a substrate to form a powder layer and the powder layer is heated to a temperature sufficient to cause the powder to melt and form a unified layer. Then the unified layer is cured to form a cured powder coating on the substrate. Once the powder coating on the substrate is cured, the cured powder coating is heated to a temperature greater than the Tg of the cured powder coating and a texture is imparted using a release medium having a replicative surface. Once the texture is imparted using the release medium, the release medium is removed from the cured, textured powder coating.

EXAMPLES

Example 1

A 4 inch×6 inch×0.02 inch aluminum panel coated with a thermoset polyester powder (Bike Black from Dupont (E. I. du Pont de Nemours and Company; Wilmington, Del.)) with a $T_g$ of approximately 156° F. (69° C.) was cured for 15 minutes at 400° F. (204° C.) to form a cured powder coated substrate ($T_g$ measured using a TMA Q400 from TA Instruments (New Castle, Del.) using a modulated TMA test with a temperature ramp of 1° C. per minute). Once cooled, the panel was pressed at 255° F. (124° C.) for 15 minutes at 700 p.s.i. (48 bar) in a heated press (Wabash MPI; Wabash, Ind.) using a setup similar to that described by FIG. 1 using a textured release paper having an acrylate release coating (ULTRACAST® PRU Quarry (Sappi Fine Paper North America; Boston, Mass.) with a basis weight of 224 g/m²) as the release medium. The panel was then cooled to 70° F. (21° C.) under pressure, the pressure was released, and the release medium was removed. An inverse image of the release medium with 100% fidelity was formed in the surface of the powder coating.

Example 2

A 4 inch×6 inch×0.75 inch medium density fiberboard (MDF) panel coated on two sides with a low energy cure thermoset powder (Polo White from Protech Powder Inc. (Fairfield, N.J.)) with a $T_g$ of approximately 150° F. (66° C.) was cured 15 minutes at 230° F. (110° C.) to form a cured powder coated substrate ($T_g$ measured as in Example 1). Once cooled, the panel was pressed at 200° F. (93° C.) for 15 minutes at 500 p.s.i. (34 bar) in a heated press (Wabash MPI) using a setup similar to that described by FIG. 1 using a textured release paper as the release medium on both surfaces of the cured powder coated substrate. The release paper used on both sides is commercially available as ULTRACAST Universal Deco and ULTRACAST® PR Rustikal (Sappi Fine Paper North America; Boston, Mass.) with basis weights of 210 g/m² and 206 g/m² respectively. The panel was then cooled to 70° F. (21° C.) under pressure, the pressure was released, and the release medium was removed. An inverse image of the release medium with 100% fidelity was formed on both surfaces of the cured powder coated substrate.

Example 3

An 11 inch×11 inch×0.0016 inch aluminum foil coated with a thermoset epoxy powder (ASA 61 Gray from Dupont) with a $T_g$ of approximately 222° F. (106° C.) was cured 10 minutes at 400° F. (204° C.) to form a cured powder coated substrate ($T_g$ measured as in Example 1). Once cooled, the foil was pressed at 300° F. (149° C.) for 15 minutes at 900 p.s.i (62 bar) in a heated press (Wabash MPI) using a setup similar to that described by FIG. 1 using a textured release paper as the release medium against the cured powder coated surface. The release paper is commercially available as ULTRACAST® PR Ceramic with a basis weight of 246 g/m² (Sappi Fine Paper North America; Boston, Mass.). A sheet of phenolic saturated kraft paper was pressed simultaneously against the uncoated side of the aluminum foil, i.e., between powder coated substrate 10 and steel caul plate 13 in FIG. 1, to laminate the phenolic kraft to the foil. The pressure and temperature conditions selected to texture the powder coating were also necessary to cure the phenolic saturated kraft. The foil/kraft laminate was then cooled to 70° F. (21° C.) under pressure, the pressure was released, and the release medium was removed. An inverse image of the release medium with 100% fidelity was formed in the surface of the powder coating. The resulting construction consisted of a cured textured powder coated surface on one side of the foil with a rigid phenolic sheet laminated to the back side of the foil.

Example 4

A 10 inch×10 inch×0.02 inch aluminum panel coated with a thermoset polyester powder (Bike Black; see Example 1) with a $T_g$ of approximately 156° F. (69° C.) was cured for 12 minutes at 400° F. (204° C.) to form a cured powder coated substrate. Once cooled, the panel was pressed at 300° F. (149° C.) for 20 minutes at 700 p.s.i. (48 bar) in a heated press (Wabash MPI) using a setup similar to that described by FIG. 1 using an engraved chrome plate as the release medium. In this case, the release paper 14 was replaced with the engraved chrome plate with the engraved surface in contact with the surface 16 of the powder coated panel. The panel was then cooled to 70° F. (21° C.) under pressure, the pressure was released, and the release medium was removed. An inverse image of the release medium with 100% fidelity was formed in the surface of the powder coating.

Example 5

A 4 inch×6 inch×0.02 inch aluminum panel coated with a thermoset polyester powder (Silvadillo from Dupont) with a $T_g$ of approximately 156° F. (69° C.) was cured for 12 minutes at 400° F. (204° C.) to form a cured powder coated substrate ($T_g$ measured as in Example 1). Once cooled, the panel was pressed at 280° F. (138° C.) for 15 minutes at 400 p.s.i. (28 bar) in a heated press (Wabash MPI) using a setup similar to that described by FIG. 1 using a textured release paper as the release medium. The release paper is commercially available as STRIPKOTE® VEZ Flat (Sappi Fine Paper North America; Boston, Mass.) with a basis weight of 154 g/m². The panel was then cooled to 70° F. (21° C.) under pressure, the pressure was released, and the release medium was removed. An inverse image of the release medium with 78% fidelity was formed in the surface of the powder coating.

The methods of the appended claims are not limited in scope by the specific methods described herein, which are intended as illustrations of a few aspects of the claims and any methods that are functionally equivalent are within the scope of this disclosure. Various modifications of the methods in addition to those shown and described herein are intended to fall within the scope of the appended claims. Further, while only certain representative methods and aspects of the methods are specifically described, other methods are intended to fall within the scope of the appended claims. Thus a combination of steps, elements, components, or constituents may be explicitly mentioned herein; however, all other combinations of steps, elements, components, and constituents are included, even though not explicitly stated.

What is claimed is:

1. A method for imparting a texture to a cured thermoset powder coated surface comprising:
    providing a substrate having a cured thermoset powder coating on a surface;
    heating the cured powder coating to a temperature greater than the Tg of the cured powder coating;
    after heating the cured powder coating to the temperature greater than the Tg of the cured powder coating, imparting a texture to the cured powder coating using a release medium having a replicative surface; and then
    removing the release medium from the cured, textured powder coating.

2. The method of claim 1, further comprising pressing the release medium against the cured powder coating using a static press.

3. The method of claim 2, wherein the press is heated.

4. The method of claim 1, further comprising pressing the release medium against the cured powder coating using a pressure nip.

5. The method of claim 4, wherein the pressure nip is heated.

6. The method of claim 1, wherein the release medium is a release sheet.

7. The method of claim 1, wherein the release medium is in the form of a web.

8. The method of claim 6, wherein the release medium is a paper or a film.

9. The method of claim 7, wherein the release medium is a paper or a film.

10. The method of claim 2, wherein the release medium is pressed against the cured powder coating at a pressure between about 50 p.s.i. (4 bar) and about 1400 p.s.i. (97 bar).

11. The method of claim 4, wherein the release medium is pressed against the cured powder coating at a pressure between about 50 p.s.i. (4 bar) and about 1400 p.s.i. (97 bar).

12. The method of claim 2, wherein the release medium is pressed against the cured powder coating at a pressure between about 400 p.s.i. (28 bar) and about 700 p.s.i. (48 bar).

13. The method of claim 4, wherein the release medium is pressed against the cured powder coating at a pressure between about 400 p.s.i. (28 bar) and about 700 p.s.i. (48 bar).

14. The method of claim 1, wherein the release medium having a replicative surface is an engraved plate or an engraved roll.

15. The method of claim 1, wherein the release medium has a topography at the replicative surface below the wavelength of light.

16. The method of claim 1, wherein the replicative surface of the release medium is reproduced in the cured powder coating with up to 100% fidelity.

17. The method of claim 1, wherein a modulus of the release medium is greater than a modulus of the cured powder coating being textured at the temperature greater than the Tg of the cured powder coating.

18. The method of claim 1, further comprising providing the release medium by applying a curable release coating to a flexible web, imparting a texture to the curable release coating and curing the curable release coating to form a textured surface layer.

19. The method of claim 18, wherein the texture is imparted to the curable release coating on the flexible web using a roll engraved with a replicative pattern.

20. The method of claim 1, further comprising tip printing the release medium prior to imparting the texture to the cured powder coating.

21. The method of claim 1, wherein the cured powder coating is cooled below the Tg of the cured powder coating before the release medium is removed.

22. The method of claim 1, further comprising:
    applying a dry, free-flowing thermoset powder to the substrate to form a powder layer;
    heating the powder layer sufficiently to cause the powder to melt; and
    curing the powder layer to form the substrate having the cured powder coating on its surface.

23. The method of claim 22, wherein the curable material comprises an initiator capable of being activated by exposure to radiation.

24. The method of claim 22, wherein the curable material further comprises a material capable of absorbing the radiation.

25. A method for applying a textured coating to a substrate comprising:
    applying a dry, free-flowing powder of a curable material to a substrate to form a powder layer;
    heating the powder layer sufficiently to cause the powder to melt and form a unified layer;
    curing the unified layer to form a cured powder coating on the substrate;
    heating the cured powder coating to a temperature greater than the Tg of the cured powder coating;
    imparting a texture to the cured powder coating using a release medium having a replicative surface; and
    removing the release medium from the cured, textured powder coating.

26. A method for imparting a texture to a radiation cured powder coated surface comprising:
    providing a substrate having a radiation cured powder coating on a surface;
    heating the cured powder coating to a temperature greater than the Tg of the cured powder coating;
    after heating the cured powder coating to the temperature greater than the Tg of the cured powder coating, imparting a texture to the cured powder coating using a release medium having a replicative surface; and then
    removing the release medium from the cured, textured powder coating.

27. The method of claim 26, further comprising:
    applying a dry, free-flowing powder of a radiation curable material to the substrate to form a powder layer;
    heating the powder layer sufficiently to cause the powder to melt; and
    radiation curing the powder layer to form the substrate having the cured powder coating on its surface.

28. The method of claim 27, wherein the radiation curable material comprises an initiator capable of being activated by exposure to radiation.

29. The method of claim 27, wherein the radiation curable material comprises a material capable of absorbing the radiation.

30. The method of claim 27, wherein radiation curing the powder layer comprises exposing the powder layer to ultraviolet light.

31. The method of claim 26, imparting the texture to the cured powder coating comprises pressing the release medium against the cured powder coating using a static press.

32. The method of claim 31, wherein the release medium is pressed against the cured powder coating at a pressure between about 50 p.s.i. (4 bar) and about 1400 p.s.i. (97 bar).

33. The method of claim 26, imparting the texture to the cured powder coating comprises pressing the release medium against the cured powder coating using a pressure nip.

34. The method of claim 33, wherein the release medium is pressed against the cured powder coating at a pressure between about 50 p.s.i. (4 bar) and about 1400 p.s.i. (97 bar).

35. The method of claim 26, wherein the release medium is a release sheet.

36. The method of claim 26, wherein the release medium having a replicative surface is an engraved plate or an engraved roll.

37. The method of claim 26, further comprising providing the release medium by applying a curable release coating to a flexible web, imparting a texture to the curable release coating and curing the curable release coating to form a textured surface layer.

38. The method of claim 26, further comprising tip printing the release medium prior to imparting the texture to the cured powder coating.

39. The method of claim 26, wherein the cured powder coating is cooled below the Tg of the cured powder coating before the release medium is removed.

* * * * *